UNITED STATES PATENT OFFICE.

DAVID H. CHILDS, OF ALFRED, NEW YORK.

PROCESS OF PRODUCING ALUMINUM FLUORID.

1,036,453. Specification of Letters Patent. Patented Aug. 20, 1912.

No Drawing. Application filed June 6, 1908, Serial No. 437,039. Renewed June 4, 1912. Serial No. 701,653.

*To all whom it may concern:*

Be it known that I, DAVID H. CHILDS, a citizen of the United States, residing at Alfred, in the county of Allegany and State of New York, have invented a new and useful Improvement in Processes of Producing Aluminum Fluorid, of which the following is a specification.

This invention relates to the process of producing aluminum fluorid in the manufacture of aluminum oxid.

Aluminum fluorid, when calcined in the presence of water or water vapor, produces aluminum oxid as a solid and hydrofluoric acid gas. The aluminum oxid so produced is practically pure and very desirable in the manufacture of pure aluminum, but this process of obtaining it has heretofore failed to be commercially successful, owing to the difficulty and expense of producing aluminum fluorid.

The object of this invention is to provide a process whereby aluminum fluorid may be cheaply and economically produced.

In practising this invention, hydrofluoric acid gas or some other volatile compound of fluorin, for example, silicon fluorid, as explained below, is caused to pass through a compound of aluminum, preferably kaolin, which is kept moist by a steady flow of water. The water takes up the gas, forming a dilute solution of hydrofluoric acid which attacks the kaolin or other compound of aluminum, combining with the aluminum to aluminum fluorid which is dissolved in the water. The hydrofluoric acid being taken from the water in forming aluminum fluorid, leaves the water free to take up more acid from the gas, which in turn acts upon the remaining aluminum of the compound, so that eventually a strong solution of aluminum fluorid is produced. This solution is drawn off and if acid is neutralized by the addition of more kaolin or other compound of aluminum, the acid combining with the aluminum as before to aluminum fluorid, and the iron and silica of the compound being precipitated. The solution is then filtered and evaporated, the aluminum fluorid remaining in the form of crystals. The aluminum fluorid can then be calcined to produce aluminum oxid and the process can be repeated with the hydrofluoric acid gas which passes off in the calcining process.

This process is also available in connection with the process of producing aluminum oxid from aluminum silicates which is described and claimed in a co-pending application for patent thereon filed by me August 15, 1910, Serial No. 577,280, in which process an aluminum silicate is mixed with aluminum fluorid and heated sufficiently to cause the fluorin to react upon the silica, producing a volatile compound of fluorin and silicon and leaving aluminum oxid. The silicon fluorid can then be passed through a compound of aluminum kept moist by a steady flow of water, in the manner above described, and will combine with the water, forming hydrated silicon oxid, which will be precipitated, and a dilute solution of hydrofluoric acid or hydrofluosilicic acid or both. These reactions may be expressed by the following equations:

The hydrofluoric acid and the hydrofluosilicic acid so formed will attack the aluminum compound and produce aluminum fluorid in the manner above set forth. If the aluminum compound is kaolin ($Al_2O_3, 2SiO_2$), the reactions may be expressed by the following equations:

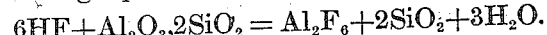

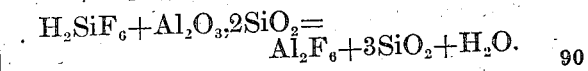

I claim as my invention:

1. The process of producing aluminum fluorid from aluminum compounds which consists in causing a volatile compound containing fluorin to pass through a mass of a compound of aluminum which is kept moist by a constant supply of water, the water taking up the volatile fluorin compound and forming a solution which attacks the aluminum compound producing aluminum fluorid and leaving the water free to absorb a further quantity of said volatile fluorin compound, thereby continuing the formation of the solution for attacking the aluminum compound, substantially as set forth.

2. The process of producing aluminum fluorid from aluminum compounds which consists in causing hydrofluoric acid gas to pass through a mass of a compound of aluminum which is kept moist by a constant supply of water, the water taking up the gas and forming a solution of hydrofluoric acid which attacks the aluminum compound producing aluminum fluorid which is dissolved in the water, the hydrofluoric acid being taken from the solution in forming the aluminum fluorid, leaving the water free to absorb a further quantity of said gas, thereby continuing the formation of a solution of hydrofluoric acid which further attacks the aluminum compound until the aluminum has been separated therefrom, substantially as set forth.

Witness my hand, this first day of June, 1908.

DAVID H. CHILDS.

Witnesses:
W. H. CRANDALL,
E. E. HAMILTON.